J. H. DUGAN & G. MONCRIEF.
BUTTER-CUTTER.
No. 173,777. Patented Feb. 22, 1876.
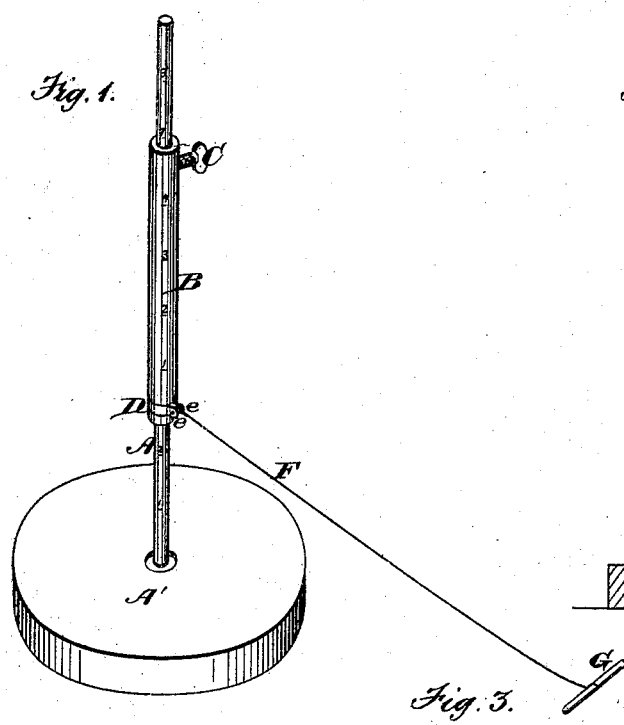
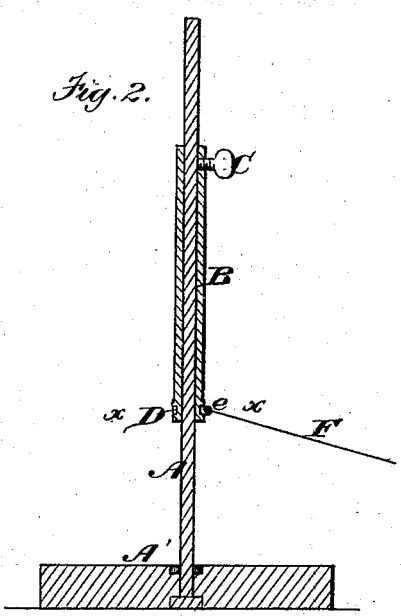
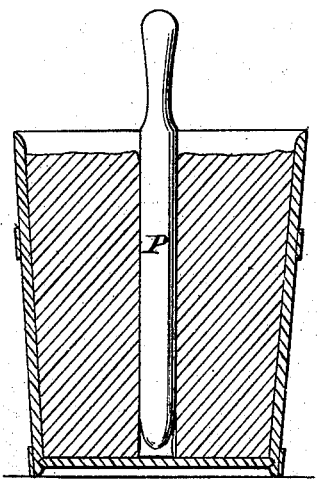
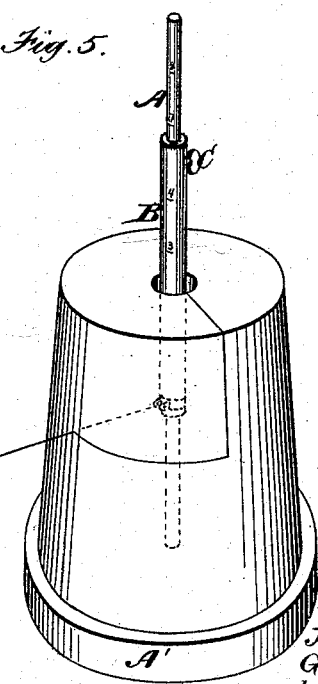
Witnesses.
Saml M. Barton
A. E. Dwison
Inventors
J. H. Dugan
G. Moncrief
by their Attys.

UNITED STATES PATENT OFFICE.

JAMES H. DUGAN AND GEORGE MONCRIEF, OF STONEHAM, MASS.

IMPROVEMENT IN BUTTER-CUTTERS.

Specification forming part of Letters Patent No. 173,777, dated February 22, 1876; application filed November 5, 1875.

*To all whom it may concern:*

Be it known that we, JAMES H. DUGAN and GEORGE MONCRIEF, of Stoneham, in the county of Middlesex and State of Massachusetts, have invented certain Improvements in Apparatus for Cutting Butter, of which the following is a specification:

In the accompanying drawing, forming a part of this specification, Figure 1 represents a perspective view of our improved apparatus. Fig. 2 represents a vertical section of the same. Fig. 3 represents a transverse section through line $x$ $x$, Fig. 2. Fig. 4 represents a sectional view of a firkin or tub of butter, showing an improved method of preparing the butter for the cutting operation, and Fig. 5 represents a perspective view, showing the manner of presenting the butter to the cutting apparatus.

This invention has for its object to provide for the use of grocers and others a simple and convenient apparatus, whereby tub or firkin butter can be cut after it is removed from its package into lumps of any desired size without the waste that usually attends the employment of a knife in consequence of the breaking off of fragments, and the adhesion of the butter to the knife-blade.

Our invention consists in a cutting apparatus composed of a single wire, pivoted to a vertical supporting-standard in such manner as to be adapted to swing both in a vertical and a horizontal plane. The wire is provided at its outer end with a handle, and its point of attachment to the standard is adjustable vertically. The supporting-standard is placed in convenient proximity to a mass of butter as it is taken from a tub or firkin, and the wire is brought to bear on the mass by swinging it in such manner as to cause it to sever a lump of the desired size from the mass, all of which we will now proceed to describe.

In the drawings, A represents a vertical rod or standard, rigidly secured to a base or pedestal, A', or other suitable support, such as the counter of a store. B is a collar or runner, adapted to slide on the standard A, and be held at any desired point thereon by a set-screw, C. D represents a ring, located on the lower end of the collar B, and adapted to be rotated independently. The ring D is provided with ears $e$ $e$, or other equivalent devices, between which is pivoted a cutter, F, composed of a length of single wire, having a handle, G, at its outer end.

The cutter F is adapted to swing in a vertical plane on its pivot, and also to be rotated with the ring D on the collar B; consequently when a mass of butter is placed near the standard A, and the collar B is adjusted to the required height, the operator, grasping the handle G, can draw the wire through the butter in a vertical or horizontal direction, or both, and cut a section of any desired size and shape from the mass. The wire passes freely through the butter, and presents no extended surfaces for the butter to adhere to, and does not cause the butter to break at the sides or bottom of the mass, while both of these objectionable results attend the employment of the ordinary knife.

The device is extremely simple, cheap, and convenient to operate, and constitutes a desirable fixture for a grocer's or marketman's counter.

We prefer to provide the standard A with a graduated scale to indicate the distance between the pivoted end of the cutter and the top or bottom of the standard, and enable us to cut a horizontal section of any desired thickness from the mass of butter.

We prefer to prepare tub or firkin butter and present it to the pivoted cutter F as follows: While the butter is in the tub or firkin a rod or plunger, P, is thrust vertically into the center of the mass from top to bottom, as shown in Fig. 4, and then withdrawn, thus making an opening through the butter large enough to receive the standard A and collar B. The tub or firkin is then inverted over the standard A, the collar B being removed therefrom, and the annular mass of butter is allowed to drop onto the pedestal of the standard in such position as to surround the standard, as shown in Fig. 5. The collar B is then placed on the standard, and moved downwardly to the desired point, and fastened by the set-screw C, the cutter being meanwhile in a substantially vertical position. When the operator desires to cut the butter he swings the cutter downwardly, horizontally, and upwardly until a piece of the desired size is severed from the mass.

When this method is practiced we prefer to provide the collar B with a graduated scale, to indicate the distance from the pivoted end of the cutter to the top of the mass. We do not limit ourselves to this method of cutting, however, as the butter may be deposited at one side of the standard A, in which case the collar B need not be elongated.

We claim as our invention—

1. The described apparatus for cutting butter, consisting of the pivoted wire cutter F, adjustable collar B, and vertical standard A, all arranged and operating substantially as described.

2. The combination of the cutter F, ring D, collar B, set-screw C, and standard A, substantially as and for the purpose specified.

In testimony whereof we have signed our names to this specification in the presence of two subscribing witnesses.

JAMES H. DUGAN.
GEORGE MONCRIEF.

Witnesses:
P. H. GAFNEY,
C. F. BROWN.